United States Patent [19]

Shames et al.

[11] 4,221,335

[45] Sep. 9, 1980

[54] FLOW CONTROLLER AND SUPPORT THEREFOR, AND FLOW CONTROLLER-NOISE REDUCER COMBINATIONS

[76] Inventors: Sidney J. Shames, 57 Holly Pl., Briarcliff Manor, N.Y. 10510; Harold Shames, 5 Agnes Cir., Ardsley, N.Y. 10502

[21] Appl. No.: 938,901

[22] Filed: Sep. 1, 1978

[51] Int. Cl.² .................................... E03C 1/084
[52] U.S. Cl. ........................... 239/428.5; 138/45; 138/46; 181/234; 239/533.1; 239/553; 239/562; 239/570
[58] Field of Search ............... 138/45, 46; 239/428.5, 239/533.1, 553, 562, 570, 590; 261/DIG. 22; 181/233–235

[56] References Cited

U.S. PATENT DOCUMENTS

| | | | |
|---|---|---|---|
| 2,716,427 | 8/1955 | Cantalupo | 138/45 |
| 2,936,788 | 5/1960 | Dahl et al. | 138/45 |
| 3,348,777 | 10/1967 | Hjulian | 239/428.5 X |
| 3,642,031 | 2/1972 | Wright | 138/45 |
| 4,091,996 | 5/1978 | Nelson | 138/45 X |
| 4,105,050 | 8/1978 | Hendrickson et al. | 138/45 |

FOREIGN PATENT DOCUMENTS 2652581  5/1978  Fed. Rep. of Germany .......... 239/570

Primary Examiner—Andres Kashnikow
Attorney, Agent, or Firm—Norman Lettvin

[57] ABSTRACT

A flow controller, for limiting total maximum water flow through a domestic flow appliance, is provided by a molded flexible body shaped to provide a deformable central flow orifice and an outermost sealing section that is adapted to be operatively positioned at the joint between a supply conduit and the flow appliance, such as a showerhead, aerator, or the like. Associated with the flow controller are: (1) an annular tubular support for positioning the portion of the flexible body with the deformable central flow orifice upstream of the sealing section, and (2) a cavitation noise reducer located immediately downstream of said central flow orifice. The cavitation noise reducer has specific construction features for use with specific appliances, and may also be provided with a downstream tubular flow straightener, or simulator, of selected length and width dimensions to effectively develop a frictional effect that reduces undesirable sound that normally accompanies use of a flow controller.

10 Claims, 8 Drawing Figures

FLOW CONTROLLER AND SUPPORT THEREFOR, AND FLOW CONTROLLER-NOISE REDUCER COMBINATIONS

FIELD OF THE INVENTION

This invention relates to a limited maximum discharge flow controlling device for insertion in a fluid conduit to maintain a substantially maximum constant rate of fluid flow over a wide range of pressures. More particularly, this invention relates to a flow controller and noise reducer attachment particularly adapted for use with domestic flow appliances of established design.

BACKGROUND OF THE INVENTION

In recent years, national and regional concern about uses of water resources has resulted in concepts of limiting the discharge by domestic appliances, as such discharge is, to a large extent, considered to be waste water. Existing domestic appliances have been designed to discharge water at a much greater rate than is now considered to be desirable.

There already exist flow controllers that, when inserted in flow conduits, respond to pressure and deform in a manner to restrict total flow therethrough. One such controller is disclosed in U.S. Pat. No. 2,728,355.

Ecological and conservation groups have shown increasing interest in urging or requiring employment of controllers for domestic use to prevent using up water resources by discharge through flow appliances at a rate above a predetermined maximum.

It has been observed that use of deformable orifice flow controllers with existing designs of certain domestic appliances, such as showerheads and aerators, tends to develop noise that is objectionable.

It is accordingly one object of the present invention to provide flow limiting flow controllers, of economic design, especially constructed for use with existing domestic flow appliances such as showerheads, aerators, and the like, wherein the controller is adapted for use with existing appliance designs in a manner to avoid development of unwanted noise, and to serve a multiple function of providing an anti-leakage seal for the appliance.

It is another object of the present invention to provide a flow controller for use with flow appliances in which the controller includes an annular upstream support positionable adjacent the central orifice of the flow controlling part for limiting the constriction of that orifice so as to pass only a predetermined maximum volume of fluid per unit time.

Due to the characteristics of the deformable molded material used, and in which the central control orifice is formed, the controllers orifice does not uniformly constrict, but a rotating lobe effect, or precession, occurs. This results in a moving fluid jet, the axis of flow of which describes a generally conical configuration whose apex is at the source of fluid. Because of said conical configuration and velocity, the fluid that issues downstream of the controller does not occupy the full, cross-sectional area available to it, causing some random downstream impingement of the fluid normal, or near normal, to the interior conduit walls. Such action is referred to generally as cavitation, and the impingement is manifested as noise.

It is therefore a further object of the present invention to provide a cavitation noise reducer in the fluid flow path immediately adjacent to and downstream of, the flow controller, the noise reducer in some instances being specifically shaped and designed for cooperation with an existing flow appliance, to reduce the random kinetic flow energy by controlling the direction of travel of the downstream flow.

Further objects and advantages of this invention will become apparent as the following description proceeds, and the features of novelty which characterize this invention will be pointed out with particularity in the claims annexed hereto and forming part of this invention.

SUMMARY OF THE INVENTION

The improved flow controller of the present invention is adapted to closely control the maximum rate of fluid discharged through a flow appliance secured to the discharge end of a flow conduit. The flow controller comprises a unitary molded body having an outermost, deformable, annular flange providing a fluid tight seal at the joint between the appliance and the flow conduit. The innermost annular portion of the controller is bounded by a deformable lip which, under the force of fluid pressure, serves to constrict the size of the flow orifice and limit the rate of fluid flow therepast to the predetermined maximum. An annular support member is provided to support central portions of the molded body located between the outermost annular flange and the lip, and said annular support member includes an elongated sleeve which spaces the deformable lip within the flow conduit upstream of the appliance, and also helps to control the constriction of the annular lip. Flow noise resulting from the action of the deformable lip in limiting fluid flow therepast is reduced by locating a cavitation noise reducer between the deformable lip and the upstream end of the flow appliance. The noise reducer may be of varying structural nature and three specific structures are disclosed.

DETAILED DESCRIPTION OF THE INVENTION

Preferred embodiments of the invention are shown in the accompanying drawings.

Figure 6:
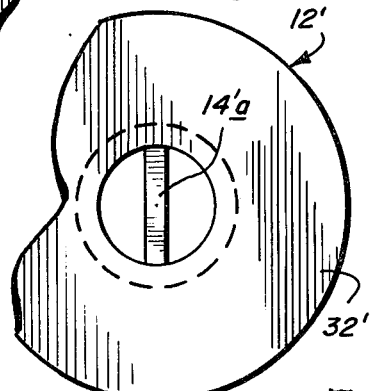
FIG. 6 is a bottom plan view similar to FIG. 3 showing corresponding parts from FIG. 5.
Figure 5:
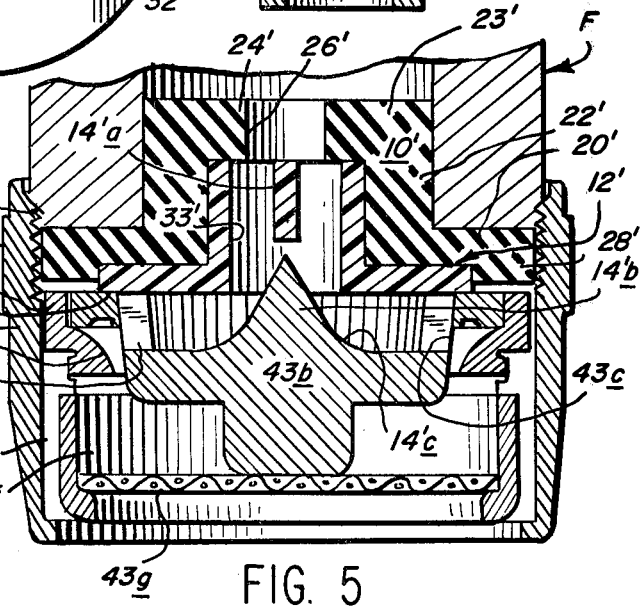
FIG. 5 is a cross-sectional view of a typical aerator showing the positioning of a flow controller, with a second embodiment of noise reducer means, upstream of the air and water mixing chamber of the aerator.

Referring now to those drawings, a molded rubber flow controller part is designated as 10, and an annular support for part 10, shaped and constructed to cooperate with flow controller 10, is designated generally as 12. A first embodiment of a cavitation noise reducer is designated 14 in FIGS. 2 and 3. A second embodiment of a cavitation noise reducer is shown in FIGS. 5 and 6 as 14′a and 14′b. A third embodiment of a noise reducer, shown in FIG. 7 includes parts 14″ and 15.

Figure 1:
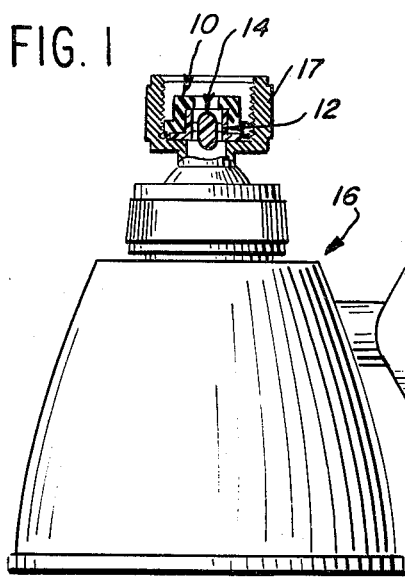
FIG. 1 is a side elevational view of a conventional showerhead having its upstream coupling end partially broken away to show the positioning of one specific flow controller or flow limiter in the coupling part of that appliance.
Figure 2:
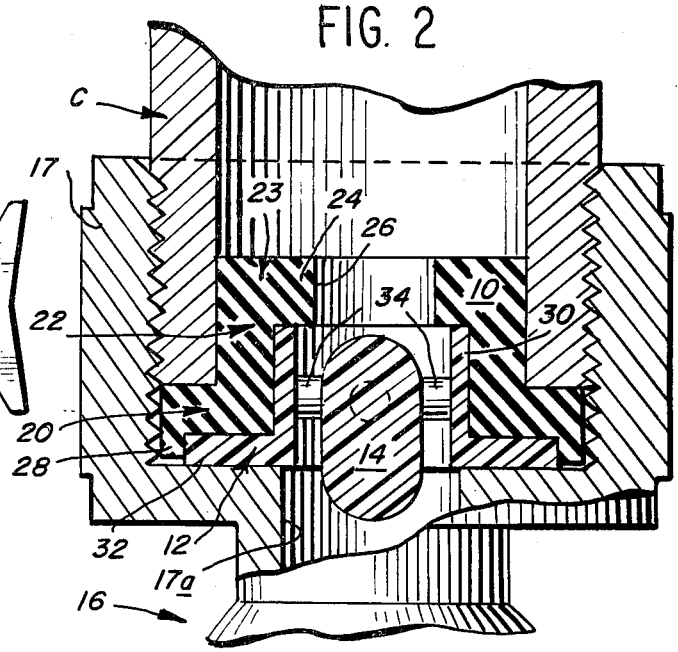
FIG. 2 is an enlarged view of the broken away portion of the coupling part of the showerhead of FIG. 1 showing the flow controller and combined support and noise reducer part in detail.

The flow controller part 10 is a simple molded flexible part that is adapted for use as part of an attachment for a domestic water-discharging flow appliance such as showerhead 16 illustrated in FIGS. 1 and 2, or aerator 18 shown in FIG. 15, or other flow discharging appliance that is designed to be removably secured to the discharge end of a flow supply conduit C. The part 10 is a unitary, resiliently deformable, molded body of rubber, or equivalent, shaped to provide an outermost, annular, sealing flange 20, a shaped cylindrical section 22 which, as shown, projects upstream of flange 20 and then turns inwardly, and an upstream annular portion 23 having an innermost annular, deformable lip 24 that is not engaged by support 12 and bounds a central orifice 26. The outermost portion of sealing flange 20 is elongated axially to provide an annular centering flange 28 for embracing and receiving a flange portion of the annular support 12.

Figure 4A:
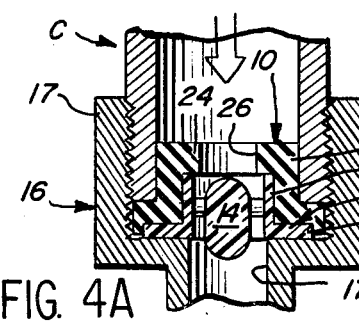
FIG. 4A is an illustrative view illustrating the flow limiter of FIG. 2 at low pressures.
Figure 4B:
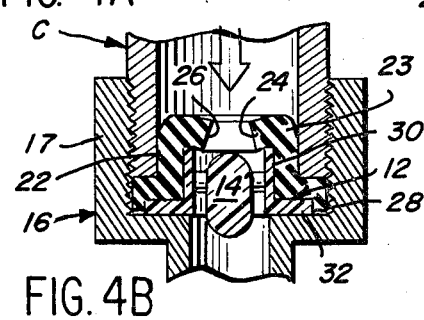
FIG. 4B is a view similar to FIG. 4A, but illustrating the flow limiter at higher pressures.

The annular support 12 includes an axially elongated support sleeve 30 having an annular flange 32, at its lower or downstream end, of a diameter less than that of sealing flange 20 and of axial dimension such as to only partially enter within annular flange 28 of body 10 to partly support sealing flange 20. The sleeve 30 engages and abuts section 22 of body 10. The thickness of the wall of sleeve 30 is less than the inward radial extent of annular portion 23 of body 10. The upstream edge of sleeve 30 supports the root of annular portion 23 at a point spaced upstream of sealing flange 22, as illustrated in FIGS. 2 and 4A, with lip portion 24 extending inwardly of sleeve 30, so that said lip portion 24 remains free to distort under increased liquid pressure, as shown illustratively in FIG. 4B, and to move and flex both inwardly and downstream to thereby constrict the size of orifice 26 and to restrict flow therethrough.

Figure 3:
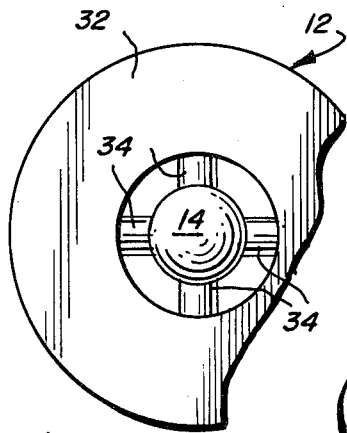
FIG. 3 is a fragmentary bottom plan view of the combined support and noise reducer part shown in FIG. 2.

Integrally formed with, or otherwise secured within, the elongated sleeve 30 of support 12 is a cavitation noise reducer 14 shown in FIGS. 2 and 3. Said noise reducer 14 is an axially elongated, torpedo-shaped body, of generally cylindrical cross section between its ends, said ends being hemispherical as shown in FIG. 2. The torpedo-shaped body 14 is supported by a plurality of cylindrical radial ribs 34 which extend between body 14 and sleeve 30. The body 14 is positioned axially relative to sleeve 30 so that the upstream end of body 14 is spaced below the upstream edge of sleeve 30, and the downstream end of body 14 projects downstream of flange 32.

In an installation for a showerhead as shown in FIGS. 1 and 2, the showerhead 16 typically includes an upstream, female-threaded, cup-shaped connector 17 adapted for securement to the threaded discharge end of a flow conduit C. The connector 17 provides an outlet flow passageway 17a.

The flow controller and support of FIGS. 1 and 2 is inserted into the cup-shaped connector 17 with the flange 28 seated on the bottom wall of the connector 17. The outer diameter of the sealing flange 20 operates to center the assembly. The outer diameter of body section 22 is such as to telescope into conduit C and lie closely adjacent the inner wall of conduit C. As the connector 17 is screwed onto conduit C, the sealing flange 20 is engaged by the terminus of conduit C and distorted to effect a liquid tight seal, while the body 10 and its support 12 are clamped in position within connector 17. The spacing of flange 28 of body 10 above the downstream side of support flange 32 accommodates the distortion of sealing flange 20 under clamping pressure from conduit C.

In the construction shown in FIGS. 5 and 6, the flow appliance 18 is an aerator that includes a casing 40 with a female threaded upstream end 42. The jet forming means of the aerator, includes an annular support ring 43a, and a center plug 43b supported in said ring, as are known in the prior art. The center plug 43b has an upwardly facing support surface 44 for supporting member 12′.

The center plug 43b is provided with a circumferentially arranged series of vertically elongated radial slits 43c, two of which are seen in the vertical cross-sectional view of FIG. 5, and through which incoming water is directed in high velocity jets against a curved annular impingement surface 43d on the ring 43a to effect breakup of liquid and mixing of the liquid with air that is aspirated into the casing 40 through vertical air inlets 43e. The water and air mix in mixing chamber 43f and then discharge in a coherent aerated stream through screen 43g.

Flow-controller and noise reducer parts in the construction of FIGS. 5 and 6 that correspond to similar parts in FIGS. 2–4B, are given the same numeral with a prime mark. Thus, in the device shown in FIGS. 5 and 6, the construction includes a molded, resiliently deformable body 10′, that is similar to the one shown in FIG. 2 and described hereinabove, and a support 12′. The proportions of body 10′ and support 12′ differ from that shown in FIG. 2. Thus, the diameters of sleeve 30′ and flange 32′ are smaller relative to the internal diameter of casing 40, and the radial width of sealing flange 20′ on body 10′ is greater. The casing 40 is adapted to connect to the threaded spout of a faucet F that has a wall thickness greater than conduit C. The support 12′ includes an axially elongated support sleeve 30′, and an annular flange 32′, generally as described above. However, the noise reducer for use with the aerator appliance differs from the torpedo-shaped body 14 of FIGS. 1–3.

To effect noise reduction, the upper end of support sleeve 30′ is provided with a diametric bar, or rib 14′a that, as seen in FIG. 5, is of greater axial length than thickness, in a ratio of about 3.5:1. The presence of the bar 14a does not adversely affect the flow-controlling flexing character of lip portion 24 of resilient body 10, as illustrated generally in FIGS. 4A and 4B. But the use of bar 14′a may not be sufficient to reduce cavitation noise level.

It has been discovered that cavitation noise level can be greatly reduced by providing the central portion of the center plug 43b of the aerator with a conical projection 14′b that projects from its base upstream to a point where the apex of projection 14′b enters into the flow passageway 33′ bounded by the sleeve 30′ and annular flange 32'. The annular base of projection 14'b is gently curved or faired with annular surface 14'c to provide a smooth anti-cavitation boundary wall for directing axially-moving incoming water from the constricted flow passageway 33' toward the radially-directed jet-forming slits 43c.

The action of parts 14'a and 14'b in FIG. 5 is believed to be as follows. The axially elongated rib 14'a serves to divide the incoming water into two channels, and/or to reduce its velocity or turbulence without a great pressure drop. The downstream edge of rib 14'a terminates closely adjacent but spaced above the apex of conical projection 14'b. The conical projection 14'b receives the reduced-turbulence incoming water and directs the water radially outwardly along a path that includes turbulence-reducing flare, or fairing, 14'c.

Figure 7:
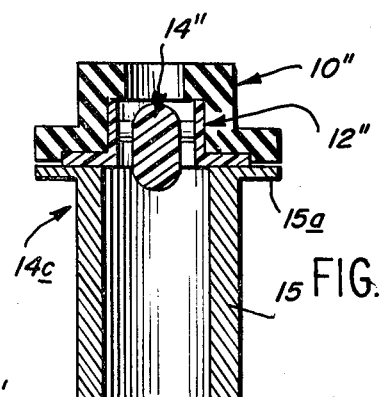
FIG. 7 is a cross-sectional view of a third embodiment of flow controller and noise reducer attachment for use with other water consuming appliances.

In the modified construction shown in FIG. 7 there is shown a flow simulator that includes body 10", support 12", and turbulence reducer 14", all similar to the construction shown in FIG. 2. That structure is combined with an elongated, flow-straightening, downstream flow-receiver 15, that is flanged at 15a for ease of mounting or connection within a casing. The combination of parts constitutes a flow-simulator, generally 14c, for reducing cavitation noises. The theory of the flow simulator is as follows:

Upstream orifice flow velocities are influenced by the conditions existing in downstream flow conduits. It is for this reason that a flow controller, such as 10 or 10' in a given flow appliance must be matched to that appliance. In order to use a flow controller 10 or 10', that is adapted for use with a particular appliance, but with a different appliance, it is necessary to position another device that simulates the flow conditions of the original appliance between the flow controller 10 or 10' and the new appliance.

FIG. 7 illustrates the torpedo-shaped, cavitation noise reducer 14 of FIG. 2, specifically designed for use with the showerhead 16, but positioned upstream of a flow simulator depicted as a flanged, cylindrical fluid conduit 15. The length and diameter dimensions of the flanged conduit 15 are specifically designed to simulate the downstream conduit conditions of the appliance for which the noise reducer was originally designed. By locating the flow-simulator 14c in the fluid flow path, a given cavitation noise reducer, such as 14, may be used with an appliance for which it was not originally designed.

It is to be understood that, although the flow-simulator of FIG. 7 has been described as including a straight, cylindrical downstream member 15, other designs, such as cylindrical downstream tubular member with a restricted egress, or a cylindrical tubular member with an impingement plate downstream of its egress end, or any combination of these configurations may be used. It is only necessary that the flanged conduit 15, or its equivalent, duplicate the flow characteristics of the appliance for which the noise reducer 14 was originally designed.

THEORY OF OPERATION

The generally tubular upstream-projecting, insert consisting of resilient body 10 and support 12, of the present invention is adapted to telescope into the supply fluid conduit that is upstream of the flow appliance. An increase in pressure of the fluid upstream of the controller body 10 serves to constrict the overhanging annular lip 24 that bounds the controller orifice 26. To prevent complete flow shut-off and to limit the constriction of the lip 24, the elongated sleeve 30 of the annular support 12 is inserted within the recess 28 in the downstream end of the controller 10. Because of the inherent nature of a rubber, or rubber-like controller 10, the lip 24 is compressed by pressure of the incoming liquid to produce a moving fluid jet whose axis of flow describes a conical surface, the apex of which is at the jet source. The velocity and configuration of the fluid jet produces violent downstream impingement of fluid normal to the conduit walls, resulting in cavitation manifested as noise.

To eliminate the cavitation and noise, a cavitation noise reducer such as 14 of FIG. 2, or 14a and 14b of FIG. 5, is placed in the path of flow downstream of central orifice 26. The fluid jet passing through the controller orifice 26 impinges upon the noise reducer 14 which reduces the kinetic energy of the fluid. This is accomplished in an appliance, such as a conventional showerhead, by placing a torpedo-shaped noise reducer 14 in the fluid stream; and accomplished in an appliance such as a conventional aerator by using a cone-shaped body 14b and fairing 14c in the jet flow.

However, because of the relatively short axial length of the aerator, the apex of the cone cannot be located sufficiently close to the jet source or centered in the jet stream. It therefore becomes necessary to limit the precess angle of the jet stream by locating a bar 14a diametrically across the annular support sleeve 30 which axially divides the flow from central orifice 26 of body 10 into two channels that each fills with fluid and causes the downstream conduit to fill substantially and thereby effect normal aerator flow.

Because flow velocities through the central orifice 26 of body 10 are influenced by downstream flow conditions, such as fluid conduit shape and conduit friction factors, each flow controller 10 must be specifically designed for the flow appliance with which it is to be employed. When it is desired to use a flow controller 10 designed for one type of appliance in another type of appliance, it is necessary to simulate the downstream flow conditions of the latter appliance.

One type of flow simulator takes the form of a flanged cylindrical fluid conduit 15 whose length and diameter dimensions are calculated to provide the downstream flow conditions of the original appliance. The fluid flow path through the flanged conduit can be straight cylindrical, cylindrical with a restricted egress, cylindrical with an impingement plate, or any combination thereof as long as the original flow conditions are effectively simulated.

While particular embodiments of this invention have been shown and described, it will be obvious to those skilled in the art that various changes and modifications may be made therein without departing from the spirit and scope of the invention and, therefore, it is intended in the appended claims to cover all such changes and modifications which fall within the true spirit and scope of the invention.

What is claimed is:

1. In a flow controller for limiting the amount of liquid discharged through a flow appliance that is to be removably secured to the discharge end of a flow conduit, wherein said flow controller includes
   a unitary, elongated, annular, molded body shaped to provide an outermost annular flange that, upon connection of the flow appliance to the flow conduit, operates to provide a seal to prevent leakage of fluid at the joint between the appliance and the flow conduit, an innermost annular portion of said molded body defining at its innermost periphery an annular resiliently deformable lip whose deformation under the pressure of flowing fluid operates to constrict the size of the flow orifice bounded by said lip, for limiting the volume of fluid flow therethrough to a predetermined maximum, and an annular support for central portions of the molded body that are located axially between said outermost annular flange and said annular deformable lip, said support including an elongated sleeve that serves to space the deformable lip within the flow conduit upstream of said seal between the conduit and the flow appliance; the improvement comprising, in combination:

the radial extent of the annular deformable lip being selected so that prior to deformation under pressure of flowing water said lip extends radially inwardly of an upstream projection of the flow path bounded by the elongated sleeve of the annular support, and said support including an annular flange extending radially outwardly of said elongated sleeve and having a maximum diameter less than the diameter of the annular flange on the molded body.

2. A flow controller as in claim 1 further including cavitation noise reduction means located axially between said upstream deformable lip portion and the upstream end of said flow appliance for substantially eliminating flow noise that results from action of the deformable lip portion in limiting flow of liquid therepast.

3. A flow controller as in claim 2 wherein the flow appliance is a showerhead, and the cavitation noise reduction means is a generally torpedo-shaped, axially elongated, body spaced concentrically of said annular support and molded integrally with said support, and spaced downstream of the upstream edge of said elongated sleeve.

4. A flow controller as in claim 2 wherein the noise reduction means includes a centrally positioned body in the path of flow located immediately downstream of the flow orifice bounded by the deformable lip, and a flow straightening means separate from said centrally positioned body positioned downstream of said body.

5. A flow controller as in claim 4 wherein the flow straightening means is an elongated, cylindrical fluid conduit means.

6. An attachment for use with a flow appliance and an upstream conduit for connecting to and supplying the flow appliance with at least the maximum volume of flow which the appliance is designed to pass, said attachment comprising, in combination:

a flow controller and noise reducer carried by the appliance and arranged to extend within the conduit upstream of the appliance, said flow controller and noise reducer including an axially elongated, annular, resilient, body that is shaped to provide an axially elongated, flexible, sleeve having formed at the upstream end thereof an inwardly extending resilient annular part and at the downstream end thereof an outwardly extending annular sealing flange, the upstream, flexible, annular part being responsive to pressure of incoming fluid to limit flow therethrough to a predetermined maximum volume per unit of time that is less than the designed flow carrying capacity of the appliance, and a rigid annular support part cooperating with said resilient body, said rigid annular part defining an upstream sleeve of a size and shape to extend through said sleeve of the resilient body and to engage only a portion of the inwardly extending resilient annular part, and an outwardly extending support annulus of smaller diameter than the diameter of the sealing flange on the resilient body for engaging a portion of the outwardly extending annular sealing flange of the resilient body; and a cavitation noise reduction means positioned in the flow passageway that extends downstream between said flexible annular part and the appliance.

7. An attachment as in claim 5 wherein the appliance is a showerhead, and the cavitation noise reduction means is a generally torpedo-shaped body positioned downstream of said flexible annular part.

8. An attachment as in claim 6 wherein the flow appliance is an aerator in which flow is directed radially outwardly, and wherein the cavitation noise reduction means includes an upstream divider wall for first dividing flow that discharges from the flexible annular part, and an upstream pointing cone shaped body spaced downstream of said divider wall for turning axial flow to radial flow.

9. An attachment as in claim 6 wherein the cavitation noise reduction means includes a centrally positioned body positioned downstream of the flexible annular part, and an elongated flow straightening conduit extending downstream of said centrally positioned body.

10. A flow controller for limiting the amount of liquid discharged through a flow appliance that is to be removably secured to the discharge end of a flow conduit, said flow controller comprising, in combination:

a unitary, annular, molded body shaped to provide an outermost annular flange that, upon connection of the flow appliance to the flow conduit, operates to provide a seal to prevent leakage of fluid at the joint between the appliance and the flow conduit, an innermost annular portion of said molded body defining at its innermost periphery an annular resiliently deformable lip whose deformation under the pressure of flowing fluid operates to constrict the size of the flow orifice bounded by said lip, for limiting the volume of fluid flow therethrough to a predetermined maximum, an annular support for central portions of the molded body that are located between said outermost annular flange and said annular deformable lip, said support including an elongated sleeve that serves to space the deformable lip within the flow conduit upstream of said seal between the conduit and the flow appliance, cavitation noise reduction means located axially between said upstream deformable lip portion and the upstream end of said flow appliance for substantially eliminating flow noise that results from action of the deformable lip portion in limiting flow of liquid therepast; the flow appliance being an aerator, and the cavitation noise reduction means including a divider wall extending diametrically of the annular support at the upstream end of said support for dividing the upstream portion of the flow passageway that is immediately downstream of the deformable lip into two chambers, and an elongated cone in said flow passageway spaced downstream of the divider wall and extending into the flow appliance, said cone having a smoothly flared base for gently turning the axial flow from said flow passageway to flow in radial directions.

* * * * *